United States Patent Office 2,977,353
Patented Mar. 28, 1961

2,977,353
NEW MONOAZO DYESTUFFS

William Elliot Stephen, Manchester, England, assignor to Imperial Chemical Industries Limited, London, England, a corporation of Great Britain No Drawing. Filed May 23, 1958, Ser. No. 737,221
Claims priority, application Great Britain June 5, 1957
15 Claims. (Cl. 260—153)

This invention relates to new monoazo dyestuffs and more particularly it relates to new yellow and orange monoazo dyestuffs derived from cyanuric halides.

The present invention is a modification of the invention described in United Kingdom Patent No. 774,925 which describes and claims new monoazo dyestuffs of the formula:

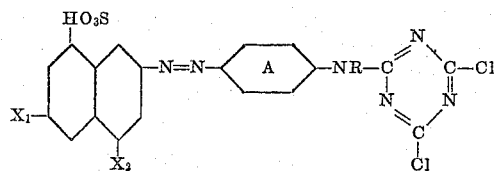

Formula 1 wherein the benzene nucleus A may optionally bear further substituents other than —OH and —NH$_2$ groups, R stands for a hydrogen atom or for an alkyl radical and X$_1$ and X$_2$ are such that one of the groups X$_1$ and X$_2$ stands for a hydrogen atom and the other stands for a sulphonic acid group.

According to the present invention there are provided the dyestuffs of the formula:

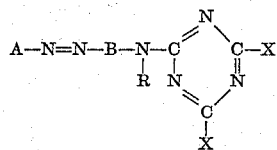

Formula 2 wherein A stands for a radical of the benzene series containing two solubilising groups of the class consisting of carboxylic and sulphonic acid groups or for a radical of the naphthalene series containing 2 sulphonic acid groups neither of which is in the 8-position of the naphthalene nucleus, A optionally carrying further substituents other than hydroxyl, amino or monoalkylamino, B stands for a 1:4-phenylene or naphthylene radical which may be substituted by methyl and/or methoxy groups, R stands for a hydrogen atom or a lower alkyl radical, and X stands for a halogen atom.

According to a further feature of the invention, there is provided a process for the manufacture of new monoazo dyestuffs which comprises interacting at least one molecular proportion of a cyanuric halide and one molecular proportion of an aminoazo compound of the formula:

A—N=N—B—NH.R wherein A, B and R have the meanings given to the symbols in Formula 2 above.

The cyanuric halide used in the above process may be, for example, cyanuric chloride or cyanuric bromide.

The aminoazo compounds used in the above process may be obtained by methods in themselves well known from the art by diazotising an aniline containing 2 solubilising groups as defined above or a disulphonapthylamine wherein neither of the sulphonic acid groups is attached to the 8 position of the naphthalene nucleus, said aniline or disulphonaphthylamine being free from hydroxyl or monoalkylamino groups, and coupling the diazonium compound so obtained with a coupling component of the formula:

H—B—NH.R wherein B and R have the meanings given to the symbols in the Formula 2 above.

Suitable anilines and disulphonapthylamines for this purpose include, for example, aniline-2:4-, 2:5- and 3:5-disulphonic acids, 4-aminotoluene-2:5-, 2:6- and 3:5-disulphonic acids, 2-aminotoluene-3:5-disulphonic acid, 6-chloro-2-aminotoluene-3:5-disulphonic acid, 4- and 5-sulpho-2-aminobenzoic acids, 2-aminoterephthalic acid, 1-naphthylamine-2:4-, 2:5-, 2:6-, 2:7-, 3:6-, 3:7-, 4:6-, 4:7- and 5:7-disulphonic acids and 2-naphthylamine-1:5-, 3:6-, 3:7-, 4:6-, 4:7-, and 5:7-disulphonic acids.

Suitable coupling components include for example o-toluidine, m-toluidine, m-anisidine, 3-amino-4-methoxytoluene, 2:5-dimethylaniline, 2:5-dimethoxyaniline, N-methyl- and N-ethyl-o-toluidines, N-methyl- and N-ethyl-m-toluidines and 1-naphthylamine-6- and 7-sulphonic acids. There may also be used the N(omega-sulphomethyl)derivatives of such coupling components, the azo compounds so obtained being treated, for example by heating with dilute aqueous alkali, to remove the N-(omega-sulphomethyl) grouping.

The process of the invention is preferably carried out in an aqueous medium. It is preferably carried out at a low temperature, for example between 0° C. and 10° C. It is sometimes advantageous to use more than one molecular proportion of cyanuric halide in order to ensure complete reaction of the aminoazo compound. An acid binding agent, preferably an alkali-metal carbonate or bicarbonate may be added if desired.

It is generally preferable to isolate the new dyestuffs from the media in which they have been formed at a pH from 6 to 8 and it has been found that the loss of halogen from the triazine rings in the dyestuffs can be reduced considerably by addition of buffering agents which give a pH value between 6 and 8 and in particular by those which give a pH of about 6.5. The buffering agents, for example mixtures of water-soluble acid salts of phosphoric acid, or mixtures of dialkylaminoaryl sulphonic acids in which the alkyl groups contain at least two carbon atoms, with their alkali metal salts may be added at any time during the manufacture of the new dyestuffs, but a convenient procedure comprises addition of sufficient acid-binding agent to the reaction mixture to give a pH between 6 and 8, then addition of buffering agent and then salt to precipitate the dyestuff, isolation of the latter by filtration and addition of more buffering agent to the dyestuff paste before drying.

The drying of the dyestuff paste is preferably carried out at a temperature below 65° C.

The dry, buffered dyestuff composition in many cases has greater storage stability than either the moist dyestuff paste or the unbuffered composition.

The new monoazo dyestuffs, in the form of the alkali metal salts are soluble in water and are preferably used to colour silk, wool, regenerated protein and cellulosic textile materials for example cotton, linen and viscose rayon, by treating the textile material with an aqueous solution (which may be a thickened printing paste) of the dyestuff in conjunction with a treatment with an alkaline agent, for example sodium hydroxide, potassium phosphate, sodium bicarbonate or sodium carbonate. The treatment with the alkaline agent may be carried out prior to, simultaneously with or after the treatment with the dyestuff.

The new dyestuffs may also be applied to silk, wool, regenerated protein, polyamide, and modified polyacrylonitrile textile materials, by the conventional dyeing methods used for those textile materials, that is by dyeing from weakly acid or neutral dyestuff solutions, for example dyestuff solutions containing acetic acid, formic acid, sodium sulphate or ammonium acetate.

The dyestuffs may also be applied to silk, wool and regenerated protein textile materials by the conventional printing methods used for those materials.

When so applied they give orange to yellow shades, very fast to washing and fast to light.

The invention is illustrated but not limited by the following Example in which parts are by weight:

*Example*

Diazotised aniline 2:5-disulphonic acid is coupled with m-toluidine and 41.5 parts of the disodium salt of the aminoazo compound so obtained are dissolved in 400 parts of water.

19 parts of cyanuric chloride are dissolved in 100 parts of acetone and the solution is added to a stirred mixture of 210 parts of water and 300 parts of ice. The solution of aminoazo compound is added during 40 minutes to the suspension of cyanuric chloride so obtained and the mixture is stirred at a temperature below 6° C. After 25 minutes and at frequent intervals thereafter during the next 60 minutes sodium carbonate solution is added to neutralise the mixture to litmus. Sodium chloride is then added at the rate of 15 lbs. for each 10 gallons of reaction mixture. The mixture is stirred for 30 minutes, then filtered and the residue on the filter is mixed with 12 parts of a 1.8:1 mixture of anhydrous potassium dihydrogen phosphate and anhydrous disodium hydrogen phosphate and dried at 30° C.

The product so obtained is essentially the N(2:4-dichloro-s-triazinyl) derivative of the aminoazo compound used as starting material, i.e. the dyestuff 4'-(4'',6''-dichloro-2''-trazinylamino)-2'-methyl-azobenzene-2,5-disulfonic acid. When applied to cellulosic textiles by the methods described above, it gives reddish yellow shades having excellent fastness to washing and to light.

The following table describes further examples of new azo dyestuffs of the invention obtained by the method described in the above example by interacting equimolecular proportions of cyanuric chloride and the aminoazo dyestuff obtained by coupling the diazo component named in the first column with the coupling component named in the second column. All give yellow shades.

| Diazo Component | Coupling Component |
| --- | --- |
| 2-naphthylamine-3:6-disulphonic acid | cresidine. |
| Do | m-toluidine. |
| Do | o-toluidine. |
| Do | 1-naphthylamine-6-sulphonic acid. |
| Do | N-methylaniline. |
| Aniline-2:4-disulphonic acid | m-toluidine. |
| Aniline-3:5-disulphonic acid | Do. |
| 4-aminotoluene-3:5-disulphonic acid | Do. |
| 1-naphthylamine-3:6-disulphonic acid | Do. |
| 1-naphthylamine-3:7-disulphonic acid | Do. |
| 2-naphthylamine-1:5-disulphonic acid | Do. |
| 2-naphthylamine-1:5-disulphonic acid | 1-naphthylamine-7-sulphonic acid. |
| 2-naphthylamine-5:7-disulphonic acid | m-toluidine. |

The dyestuffs so obtained are, respectively, 2-[4'-(4'',6'''-dichloro - 2'' - triazinylamino) - 2' - methyl-5'-methoxy]-phenylazo-naphthalene-3,6-disulfonic acid; 2-[4'-(4'',6'''-dichloro-2'''-triazinylamino)-2'-methyl]-phenylazo - naphthalene-3,6-disulfonic acid; 2-[4'-(4'',6''-dichloro-2''-triazinylamino)2'-methyl]-phenylazo-naphthalene-3,6-disulfonic acid; 2-[4'-(4'',6''-dichloro-2''-triazinylamino)-3'-methyl]-phenylazo-naphthalene-3,6-disulfonic acid; 4-(4'',6''-dichloro-2''-triazinylamino) - 1:2' - azonaphthalene-3',6',7-trisulfonic acid; 2-[4'-(4'',6''-dichloro-2''-triazinylamino)-N-methylamino]-phenylazo - naphthalene-3,6-disulfonic acid; 4' - (4'',6'' - dichloro - 2'' - triazinylamino)-2'-methyl-azobenzene - 2,4 - disulfonic acid; 4'-(4'',6''-dichloro - 2'' - triazinylamino) - 2' methyl-azobenzene-3,5-disulfonic acid; 4' - (4'',6'' - dichloro-2''-triazinylamino)-2':4-dimethyl-azobenzene - 2:6 - disulfonic acid; 1-[4'-(4'',6''-dichloro-2''-triazinylamino)-2'-methyl]-phenylazo-naphthalene-3,6-disulfonic acid; 1-[_4'-(4'',6''-dichloro-2''-triazinylamino)-2'-methyl]-phenylazo - naphthalene-3,7-disulfonic acid; 2-[4'-(4'',6''-dichloro-2''-triazinylamino)-2'-methyl]-phenylazo - naphthalene-1,6-disulfonic acid; 4-(4'',6''-dichloro-2''-triazinylamino)-1:2'-azonaphthalene-1',5',6-trisulfonic acid; and 2-[4'-(4'',6''-dichloro-2''-triazinylamino)-2'-methyl]-phenylazo - naphthalene-5,7-disulfonic acid.

What I claim is:

1. Monoazo dyestuffs of the formula:

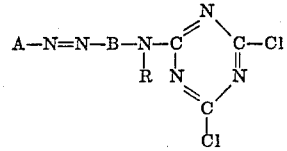

wherein A stands for a radical selected from the class consisting of phenyl substituted by two groups selected from the class consisting of carboxylic and sulfonic acid groups and 1-naphthyl-2:4-, 2:5-, 2:6-, 2:7-, 3:6-, 3:7-, 4:6-, 4:7-, and 5:7-disulfonic acids and 2-naphthyl-1:5-, 3:6-, 3:7-, 4:6-, and 5:7-disulfonic acids; and any substituent on the radical A is selected from the group consisting of methyl and chlorine; B is a divalent radical selected from the group consisting of 1:4-phenylene, methyl-substituted 1:4-phenylene, methoxy-substituted 1:4-phenylene, 1:4-naphthylene, 6-sulfo-1:4-naphthlyene, and 7-sulfo-1:4-naphthylene; and R stands for a substituent selected from the group consisting of hydrogen atom and a lower alkyl radical.

2. 4' - (4'',6'' - dichloro-2''-triazinylamino)-2'-methyl-azobenzene-2,5-disulfonic acid.

3. 2-[4'-(4'',6''-dichloro-2''-triazinylamino)-2'-methyl-5'-methoxy]-phenylazo-naphthalene-3,6-disulfonic acid.

4. 2 - [4' - (4'',6'' - dichloro - 2'' - triazinylamino) - 2' - methyl]-phenylazo-naphthalene-3,6-disulfonic acid.

5. 2 - [4' - (4'',6'' - dichloro - 2''-triazinylamino)-3'-methly]-phenylazo-naphthalene-3,6-disulfonic acid.

6. 4 - (4'',6'' - dichloro - 2''-triazinylamino)-1:2'-azonaphthalene-3',6',7-trisulfonic acid.

7. 2 - [4'-(4'',6''-dichloro - 2'' - triazinylamino) - N-methylamino]-phenylazo-naphthalene-3,6-disulfonic acid.

8. 4'-(4'',6''-dichloro-2''-triazinylamino) - 2' - methyl-azobenzene-2,4-disulfonic acid.

9. 4'-(4'',6''-dichloro-2''-triazinylamino) - 2' - methyl-azobenzene-3,5-disulfonic acid.

10. 4' - (4'',6'' - dichloro-2''-triazinylamino) - 2':4-dimethyl-azobenzene-2:6-disulfonic acid.

11. 1 - [4' - (4'',6'' - dichloro-2''-triazinylamino) -2'-methyl]-phenylazo-naphthalene-3,6-disulfonic acid.

12. 1 - [4' - (4'',6'' - dichloro-2''-triazinylamino)-2'-methyl]-phenylazo-naphthalene-3,7-disulfonic acid.

13. 2 - [4' - (4'',6'' - dichloro-2''-triazinylamino) -2'-methyl]-phenylazo-naphthalene-1,5,-disulfonic acid.

14. 4 - (4'',6'' - dichloro - 2'' - triazinylamino)-1:2'-azonaphthalene-1',5',6-trisulfonic acid.

15. 2 - [4' - (4'',6'' - dichloro-2''-triazinylamino)-2'-methyl]-phenylazo-naphthalene-5,7-disulfonic acid.

References Cited in the file of this patent

UNITED STATES PATENTS

| 2,892,828 | Stephen | June 30, 1959 |
| 2,892,829 | Stephen | June 30, 1959 |
| 2,892,830 | Stephen | June 30, 1959 |

FOREIGN PATENTS

| 774,925 | Great Britain | May 15, 1957 |